Nov. 26, 1963     K. L. ELLILÄ     3,112,263
DEVICE IN A SCREEN FILTER FITTED WITH A SLOPING SCREEN
Filed July 2, 1959     2 Sheets-Sheet 1
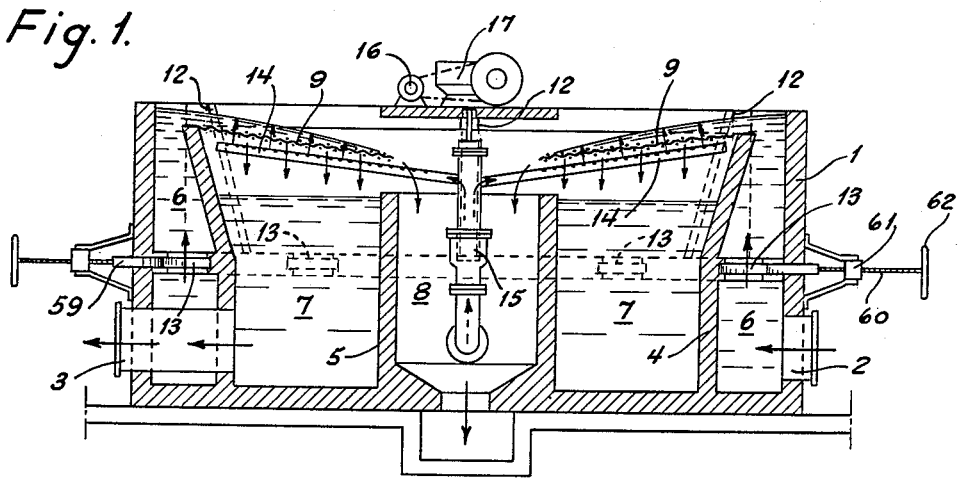
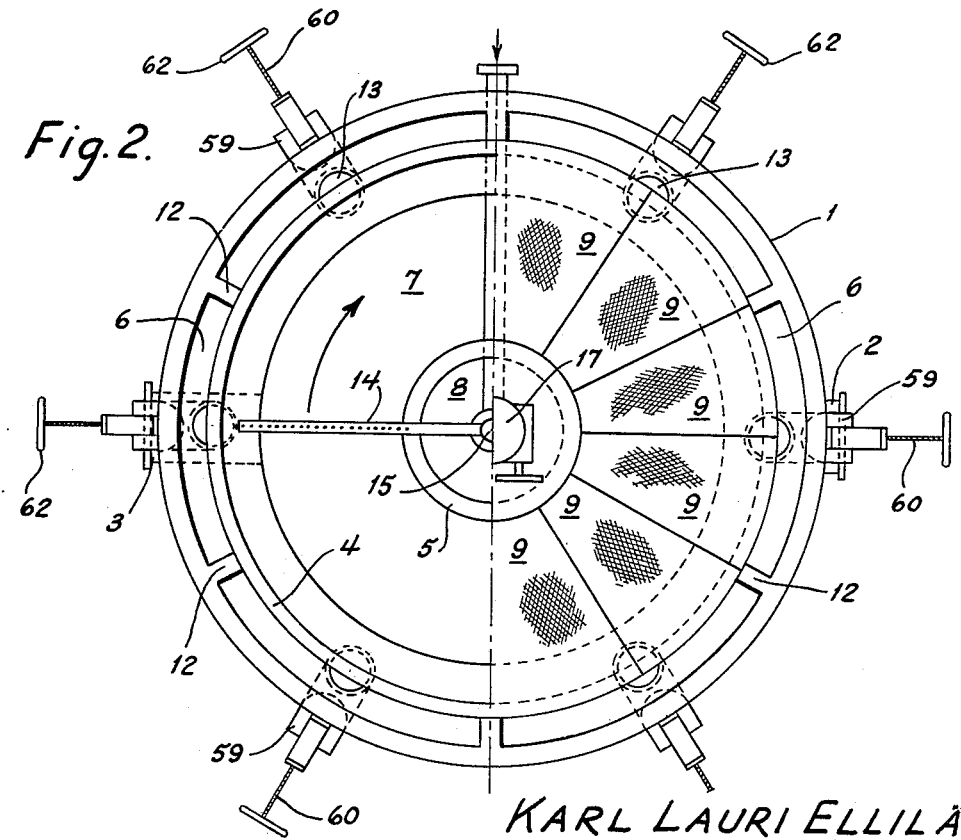
KARL LAURI ELLILÄ
INVENTOR.
BY
ATTORNEY.

Nov. 26, 1963  K. L. ELLILÄ  3,112,263
DEVICE IN A SCREEN FILTER FITTED WITH A SLOPING SCREEN
Filed July 2, 1959  2 Sheets-Sheet 2

KARL LAURI ELLILÄ
INVENTOR.

BY

ATTORNEY.

United States Patent Office 3,112,263
Patented Nov. 26, 1963

3,112,263
DEVICE IN A SCREEN FILTER FITTED WITH A SLOPING SCREEN
Karl Lauri Ellilä, Puistotie 20B, Munkkiniemi, Helsinki, Finland
Filed July 2, 1959, Ser. No. 824,527
5 Claims. (Cl. 210—411)

This invention refers to a device in a screen filter that is fitted with a sloping screen and in which the liquid to be filtered flows over an overflow at the upper end of the screen and solid impurities are removed from the lower part of the screen by means of a shower of liquid directed upwards from beneath the screen. The main characteristic of the invention is that the filter area is circular in shape, so that the liquid to be filtered flows radially towards the centre, an outlet for the solid impurities being situated in the centre of the filter.

According to one embodiment of the invention, the unfiltered liquid intake channel is divided by radial partitions into compartments, each of which is fitted with its own inlet for unfiltered liquid.

Another characteristic of the invention is that one or more radially and parallel with the screen directed shower pipes are provided for the purpose of rinsing, these shower pipes rotating with a common central inlet at the required speed, which preferably can be regulated.

According to one advantageous embodiment of the invention, a perforated plate or similar appliance is fitted above the sloping screen and joined to the overflow over which the liquid flows. The liquid to be filtered is made to flow on to the screen through this plate, which can be either horizontal or somewhat at a slant and can cover a greater or lesser part of the breadth of the screen surface in the radial direction of the flow.

The invention is presented in detail below with reference to the accompanying drawing.

FIG. 1 in the drawing shows a vertical cross section of the filter according to the invention and FIG. 2 shows the same from above, the filter being shown without screen plates in the left half of the figure.

Figure 3:
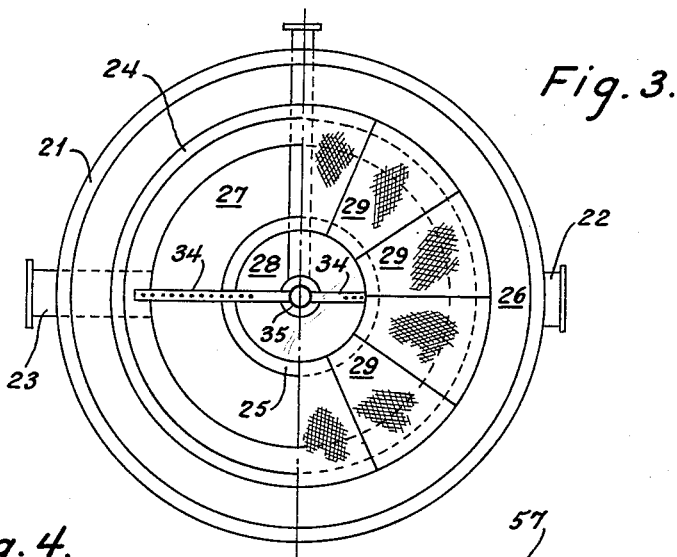
FIG. 3 shows another embodiment of the invention viewed from above in the same way as in FIG. 2.

1 in FIG. 1 is the housing of the filter, which, as can be seen in FIG. 2, is cylindrical in shape. To it is joined an inlet pipe 2 for the liquid to be filtered and an outlet pipe 3 for the filtered liquid. The filter is divided by concentric cylindrical partitions 4 and 5 into three compartments counting from the centre outwards, the liquid to be filtered being adapted to flow through the outer annular compartment 6 to the top of the screen 9 and then to be collected in annular compartment 7 from where it is removed through outlet 3. The solid impurities removed from the screen are collected in the central circular compartment 8 the impurities being removed from said compartment through an opening 10 and channel 11.

Figure 5:
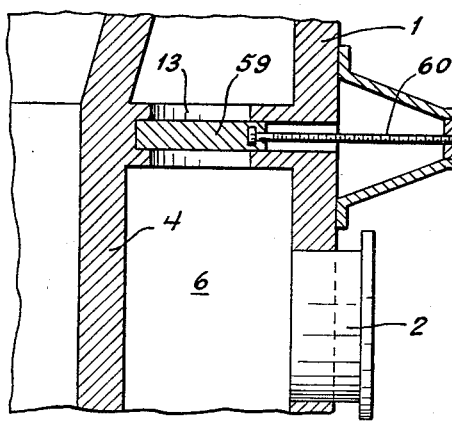
FIG. 5 is an enlarged fragmentary perspective view of one of the inlets between the upper and lower parts of the outer annular compartment including the means for opening and closing the inlet.

Intake channel 6 is further divided by radial partitions 12 into a number of compartments—six in the example shown. The channel 6 is further divided by a partition into an upper and lower part. Each compartment has its own inlet 13 between its upper and lower parts. These inlets can be opened and closed independently. The means for effecting this opening and closing as seen in FIG. 5 is a common opening and closing member in the form of a sliding gate member 59 which slides in a slot bordering the inlet 13 and is actuated by a screw 60 passing through and engaged with the screw threads in the ring 61 and actuated by the turning wheel 62.

The screen is rinsed by the shower pipes 14 underneath it. In accordance with the invention these pipes are designed to rotate continuously under the screen. For this purpose the shower pipes 14 branch radially and run parallel to the screen from a central inlet 15, which is rotated by a motor 16 at the desired preferably regulatable speed with transmission through a wormgear drive 17. One or more shower pipes can be used. For the sake of balance, however, it is advisable to use at least two.

In the drawing the flow of the liquid to be filtered before and after filtering is indicated by whole-line arrows, that of the rinsing fluid by broken-line arrows and that of the solid impurities by dot-and-line arrows.

The embodiment shown in FIG. 3 is intended for smaller units. It is for the most part similar to those presented in FIGS. 1 and 2, but the partitions 12 have been omitted, so that the outer compartment 26 is not partitioned. Thus an inlet pipe 22 is connected to the single compartment 26, the outlet pipe 23 being joined to compartment 27 for the removal of the filtered liquid. The other parts of the filter are similar to those shown in FIGS. 1 and 2, and are marked with the same reference numbers+20. The driving mechanism of the shower pipes 16, 17 have been omitted in this figure.

Figure 4:
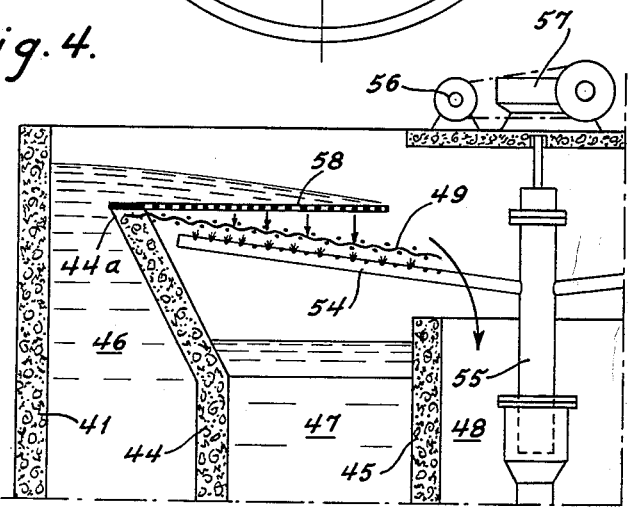
FIG. 4 shows details in larger scale of still another embodiment of the invention.

In FIG. 4 reference numeral 41 designates the filter reservoir, 44 and 45 are the cylindrical partitions, 49 the screen and 54 the rotating shower pipe unit fitted with bearings. A perforated plate 58 is fitted together with the overflow 44a, the plate 58 being over the screen 49. In the example shown here, the plate is horizontal and only partly covers the screen. The liquid which comes from compartment 46, passing over the overflow 44a, spreads first over the perforated plate 58 and then flows through this on to the screen 49, as shown by the arrows. The flow of the liquid over the plate 58 and on to the screen 49 can be adjusted as required by varying the size and/or distribution of the holes in the plate 58 and/or modifying the angle of the plate 58 to the horizontal. Solid impurities remaining on the screen are removed to compartment 48 in the centre of the filter, as in the embodiments of the invention described above.

A filter fitted with a sloping screen has the drawback that the layer of liquid, especially at the inlet side of the screen, is so thick and the flow through the screen so strong that a shower directed against the underside of the screen is unable effectively to prevent the screen surface from clogging up unless one of considerable force is used, which again reduces the efficiency of the filtering. As the inlet side gets clogged up, the water accumulation and resultant clogging gradually increase towards the outlet side until finally the efficiency of the filter decreases so much that a thorough cleaning becomes necessary, during which time the filter is out of operation.

This drawback is eliminated in the filter according to the invention as shown in FIG. 4. The perforated plate 58 distributes the liquid more evenly over the screen with the result that the layer of liquid is thinner, as can be seen in FIG. 4. Thus the shower directed against the underside of the screen can easily keep the screen clean and need not be too powerful.

The filter according to this invention has many advantages over earlier filters in which the various compartments were fitted in rows one after another on one or both sides of the intake channel. The circular shape of the screen ensures the greatest possible length of overflow per screen area, the length of the overflow being a decisive factor in the capacity of the filter. The longer the overflow the shallower the layer of water that can be led over the overflow on to the screen in the same time unit. This makes rinsing easier and reduces the danger of clogging. From a maintenance point of view, too, this filter has the advantage that the different compartments can be disconnected singly for cleaning and servicing, whereas in the present models the whole filter has to be taken out of operation for cleaning and repairing. Another advantage lies in the rinsing apparatus: the shower pipes are always at the same distance from the screen and the direction of the shower remains constant.

The invention is not limited to the embodiments presented above and shown in the drawing; many variations are possible within the limits of the invention. For instance, the filter reservoir can be polygonal in shape, the perforated plate 58 can be set at any angle required and the extent to which it covers the screen in the direction of the flow can be varied.

What I claim is:

1. In screen filter construction in combination, an annular screen member formed to slope downwardly from the outer periphery to the inner periphery thereof, an annular intake channel member for unfiltered liquid formed with concentric inner and outer walls with the top of said inner wall being disposed at a lower level than the top of said outer wall, said channel member surrounding said outer periphery of said screen member and being positioned below the same, said top of said inner wall supporting said screen member, lying at the same level as and engaging said outer periphery whereby liquid to be filtered onto said screen can flow upwardly in said channel and around and over said outer periphery to be filtered in flowing from said outer periphery towards said inner periphery, outlet means for solid impurities positioned at said inner periphery, rotatable means for directing a shower of rinsing liquid upwardly from beneath and against said screen and said annular intake channel member being formed with a horizontal partition dividing said channel member into an upper portion and an annular uninterrupted lower portion, said upper portion being formed with radial partitions dividing said upper portion into radial compartments, and means formed in said horizontal partition in registry with each of said radial compartments for individually connecting and disconnecting each of said radial compartments separately with respect to said uninterrupted lower channel portion.

2. Screen filter construction as in claim 1, said rotatable means including members extending beneath and closely adjacent said screen and throughout substantially all of the radial extent thereof.

3. In screen filter construction in combination, an annular screen member formed to slope downwardly from the outer periphery to the inner periphery thereof, an annular intake channel member for unfiltered liquid formed with upstanding concentric inner and outer walls, with the top of said inner wall being disposed at a lower level than the top of said outer wall, said channel member surrounding said outer periphery of said screen member, said screen member being supported by said inner wall and said outer periphery of said screen member engaging said wall at a position adjacent to but below the top thereof, a perforated plate-like distributing member formed to be substantially coextensive with said screen member for distributing liquid to be filtered through the perforations therein onto said screen member, the outer periphery of said distributing member being mounted on said top of said inner wall, said distributing member lying in spaced overlying relationship with respect to said screen member, said distributing member also being formed with an inner edge, whereby liquid to be filtered onto said screen can flow upwardly in said intake channel member over said outer periphery of said distributing member to flow over the upper surface of said plate-like distributing member through said perforations and onto and over the surface of said screen member to be filtered in passage therethrough, outlet means for solid impurities positioned at said inner edge of said screen member, outlet means for filtered liquid lying beneath said screen and plate members and rotatable means positioned beneath said screen for directing a shower of rinsing liquid upwardly against said screen.

4. Screen filter construction as in claim 3, said perforated plate-like distributing member extending over the whole of said screen surface.

5. Screen filter construction as in claim 3, said perforated plate-like distributing member extending over a portion of the radial extent of said screen in the direction of the flow of liquid thereover.

References Cited in the file of this patent

UNITED STATES PATENTS

| | | |
|---|---|---|
| 1,111,217 | Cole | Sept. 22, 1914 |
| 2,258,063 | Meyer | Oct. 7, 1941 |
| 2,747,741 | Jacobson | May 29, 1956 |
| 2,892,546 | Riedel | June 30, 1959 |

FOREIGN PATENTS

| | | |
|---|---|---|
| 680,608 | France | May 2, 1930 |
| 717,433 | Germany | Feb. 13, 1942 |